Dec. 2, 1930.   C. H. STERLING   1,783,930
OVERGEAR TRANSMISSION
Filed Jan. 15, 1927
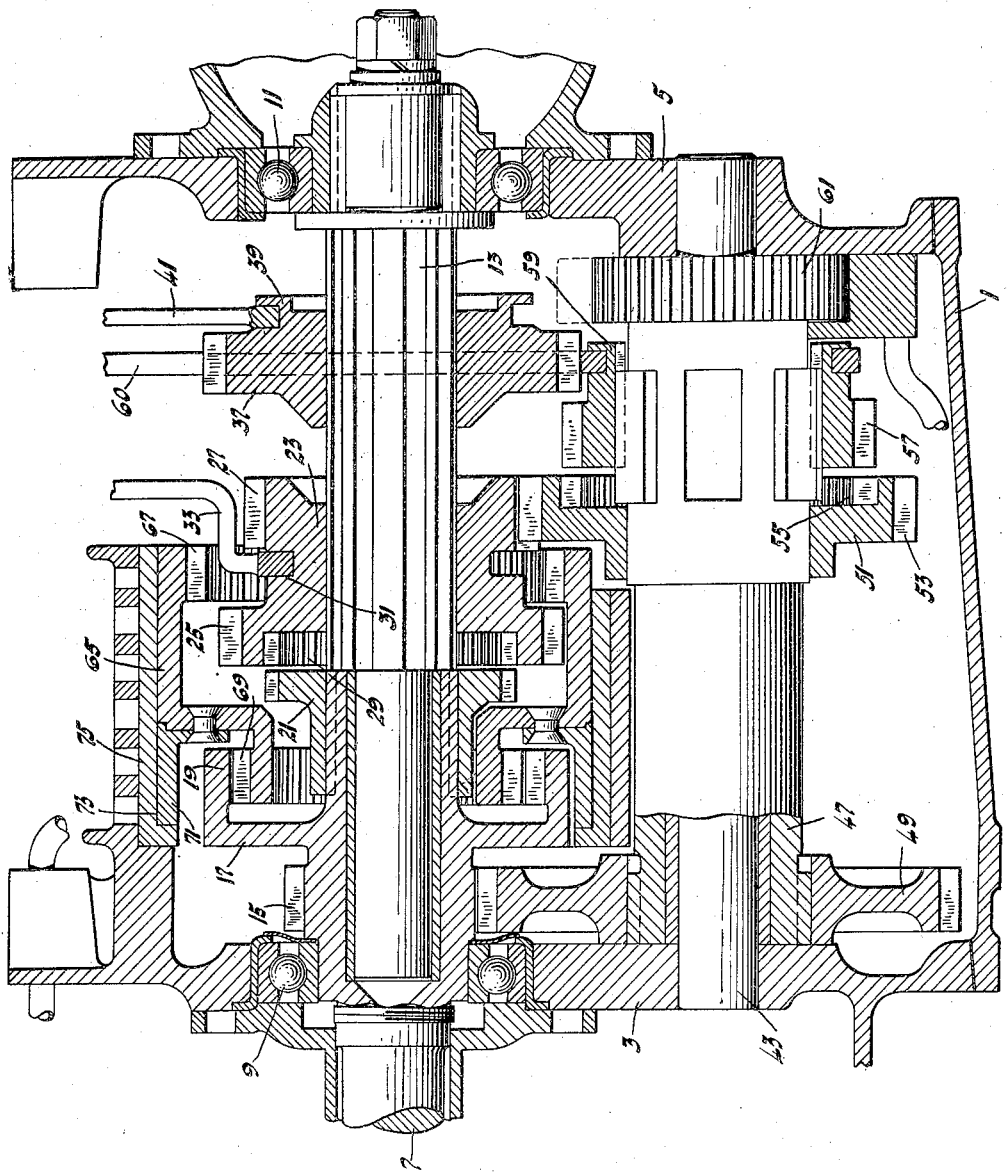
Inventor
Claude H. Sterling
By
Attorneys Patented Dec. 2, 1930

1,783,930

UNITED STATES PATENT OFFICE

CLAUDE H. STERLING, OF DETROIT, MICHIGAN, ASSIGNOR TO GENERAL MOTORS CORPORATION, OF DETROIT, MICHIGAN, A CORPORATION OF DELAWARE

OVERGEAR TRANSMISSION

Application filed January 15, 1927. Serial No. 161,356.

This invention relates to power transmission and has been designed particularly for use in connection with variable speed mechanism on motor vehicles.

The structure of the transmission is of the kind employing a gear ring eccentrically surrounding the aligned driving and driven shafts and through which ring the driven shaft may be driven by means of two external-internal gear trains.

The object of the invention is to get a very compact arrangement. With that end in view the invention makes use of a comparatively short gear ring and adds a supplementary ring having its bearing surface in alignment with that of the gear ring and positioned radially over one of the gears of the gear ring. To the same end the final driven gear of the double external-internal gearing is combined with the second speed gear on the driven shaft. The transmission is also rendered compact by the use of plain bearings for the gear ring, suitable lubrication being provided as in my application for underspeed transmission, Serial No. 156,870, filed Dec. 24, 1926. Other objects and advantages will be apparent.

In the drawing accompanying the specification the single figure is a longitudinal vertical section through a transmission embodying my invention.

In this drawing numeral 1 represents a housing having a front wall 3 and a rear wall 5. Through the front wall a clutch shaft 7 enters the housing, bearing 9 being provided as usual. Bearings 11 in the rear wall support a driven spline shaft 13 which is piloted in the open end of the clutch shaft 7.

Just within the bearing 9 the clutch shaft is formed with external gear teeth 15, beyond which is a radial flange 17 carrying an internal gear 19. Shaft 7 is extended beyond the flange 17 and carries an externally toothed clutch member 21 at its extreme end.

Upon the adjacent end of the spline shaft there slides a hub 23 carrying gears 25 and 27. Within gear 25 the hub is formed with internal clutch teeth 29 to co-operate at times with clutch 21. Upon hub 23 between gears 25 and 27 is a groove 31 engaged by a fork 33 actuated by any conventional means, not shown. Beyond gear 27 and also slidable on the spline shaft is a gear 37 having a collar 39 engaged by a fork 41.

A fixed shaft 43 rotatably supports a countershaft 47. Shaft 47 carries a spur gear 49 in engagement with gear 15 whereby the countershaft is rotated. A gear 51 is rotatably mounted upon the countershaft. It has external teeth 53 for engagement with gear 27, and is also formed with internal teeth 55 whereby it may be locked to the countershaft when said teeth are engaged by teeth formed on the combined clutch and gear member 57 which is slidably but non-rotatably mounted on the countershaft. This gear member 57 has a collar 59 engaged by a fork 60. The countershaft is also equipped with a gear 61. Gear 61 drives a reverse idler which may be engaged by gear 37 when the latter is moved to the right from the neutral position shown in the figure.

Surrounding the aligned shafts is a gear ring 65 having a portion of reduced diameter formed with external teeth 69. At its other end the gear ring 65 takes the form of an internal gear 67. This gear ring is eccentrically positioned about the aligned shafts and the gear 69 is in constant engagement with gear 19 of the clutch shaft. The gear 67 is positioned to engage gear 25 when the latter is moved to the right from its neutral position in the drawing. As the gear ring is peripherally quite short a separate ring member 71 of L-shape is riveted to the gear ring. The ring member 71 has a surface 73 in alignment with the bearing surface of the gear ring and thus gives a long bearing surface. The bearing surface of the extension 71 is radially beyond the teeth 69 and 19 forming the first external-internal gear train. In this way a long bearing surface is afforded without unduly spacing apart the external-internal gear trains between the driving and driven shafts. Compactness is also secured by the use of a plain bearing 75 carried by the combined ring elements 67 and 71. To secure the proper lubrication the housing wall engaged by the ring 75 is apertured to admit lubricating oil. This oil may be pumped by means of a gear pump constituted by the gear 61 and the reverse idler in the manner more fully described in my application for underspeed transmission, Serial No. 156,870, filed December 24, 1926.

The operation of the transmission will be readily understood. The drawing shows the several parts in their neutral position. If the double gear 25—27 is moved to the left from the position shown by the figure clutch members 21 and 29 will give a direct drive from the clutch shaft to the spline shaft. When moved to the right from the neutral position illustrated, gears 25 and 67 engage and the spline shaft is driven from the clutch shaft through two external-internal gear trains one gear of each train being carried by the eccentrically mounted gear ring. This last position of parts gives a fourth speed in which the spline shaft is driven at a speed above that of the driving shaft. The countershaft is constantly driven by the engagement of gears 15 and 49. Therefore if gear 37 is moved to the left it engages gear 57 and the drive is then at low speed. If on the other hand gear 37 is moved to the right from its neutral position as illustrated, it engages the reverse idler driven by gear 61. From inspection of the drawing it will be seen that gears 27 and 51 are in engagement when gear 27 is in its neutral position. While in this position the countershaft may be turning while gear 51 is held from rotation by its engagement with gear 27. If, however, clutch gear 57 is moved to the left from the position shown, gear 51 is locked to the countershaft whereupon it rotates gear 27 and with it the spline shaft 13 in second speed. It may be observed that the length of teeth 27 is such that gear 51 is idly rotating when the hub member 23 is shifted for a fourth and for a third speed.

By the structure described above it will be seen that I secure compactness lengthwise by the comparatively short gear ring, a part of the bearing surface of which lies radially beyond the external gear 69 carried by the ring. Lengthwise shortening is also accomplished by the association of the second speed gear with the final driven gear of the external-internal train of the over-gear drive. This compact arrangement is made the more easy by utilizing the clutch connection between parts 55 and 57 of the countershaft. Compactness in the transverse direction is obtained by employing the plain bearing which is rendered practicable by the use of the lubricating arrangement described.

I claim:

1. In a transmission device, a gear housing, aligned driving and driven shafts, a gear ring in said housing, a bearing for said gear ring within said housing and eccentrically surrounding said shafts, external and internal gears on said ring, gears on each of said shafts to co-operate therewith, said gear ring having a bearing surface engaging said bearing, said bearing surface having portions overlying the external gear and the internal gear of the gear ring.

2. In a transmission device, aligned shafts and an eccentrically positioned gear ring surrounding said shafts, gearing between each shaft and said gear ring, an extension member secured to said gear ring to afford a long bearing surface and a cooperating bearing member for said gear ring and extension.

3. The invention defined by claim 2, said extension being in radial alignment with one of said gear trains.

4. In a transmission device, a driving shaft, an aligned driven shaft, a countershaft, constant mesh gearing between the driving shaft and the countershaft, a gear splined to the driven shaft and slidable thereon to a mean position and to two extreme positions of adjustment, driving means between said driving shaft and driven shaft comprising cooperating clutch elements on the driving shaft and the said driven shaft slidable gear, said clutch elements being engageable in one extreme position of said slidable gear, other drive means driven by said driving shaft and driving said slidable gear in a second extreme position of adjustment thereof, whereby a drive of the driven shaft at a predetermined ratio is obtained, a gear rotatably mounted on the countershaft, said slidable driven shaft gear meshing with said countershaft gear in the mean position of adjustment of the slidable driven shaft gear and means to clutch said countershaft gear from rotation about the countershaft.

5. The invention defined by claim 4, a gear element integral with said countershaft clutch means, an added gear on the driven shaft, said countershaft clutch gear and said additional driven shaft gear engageable to drive the driven shaft at a predetermined ratio.

6. In a transmission mechanism, aligned driving and driven shafts and a countershaft, a gear on the driving shaft, a gear on the countershaft in mesh therewith, a slidable gear on the driven shaft, a gear on the countershaft to be engaged by said sliding gear in one position of adjustment of said sliding gear, driving means associated with the driving shaft, the sliding gear, and the driven shaft by which the driving shaft drives the driven shaft through the sliding gear at two unlike speed ratios in each of two other positions of adjustment, in each of which the countershaft rotates idly, said gear on the countershaft being rotatably mounted and a clutch to lock said gear to its shaft, said clutch formed as an integral part of a gear element, and a cooperating gear element on the driven shaft to be engaged to be in a selected position of adjustment of said slidable clutch member.

In testimony whereof I affix my signature.

CLAUDE H. STERLING.